(12) United States Patent
Zidat

(10) Patent No.: US 9,261,003 B2
(45) Date of Patent: Feb. 16, 2016

(54) SYSTEM AND METHOD FOR TREATING EXHAUST PIPE

(71) Applicant: Scambia Holdings Cyprus Limited, Limassol (CY)

(72) Inventor: Saïd Zidat, Thionville (FR)

(73) Assignee: Bosal Emission Control Systems, N.V., Lummen (BE)

( * ) Notice: Subject to any disclaimer, the term of this patent is extended or adjusted under 35 U.S.C. 154(b) by 0 days.

(21) Appl. No.: 14/497,927

(22) Filed: Sep. 26, 2014

(65) Prior Publication Data

US 2015/0118133 A1 Apr. 30, 2015

(30) Foreign Application Priority Data

Oct. 24, 2013 (EP) .................................... 13189986

(51) Int. Cl.
| | |
|---|---|
| *B01D 53/94* | (2006.01) |
| *F01N 3/20* | (2006.01) |
| *F01N 3/22* | (2006.01) |
| *F01N 3/28* | (2006.01) |
| *F01N 3/10* | (2006.01) |
| *F01N 3/035* | (2006.01) |
| *F01N 13/00* | (2010.01) |

(52) U.S. Cl.
CPC *F01N 3/28* (2013.01); *F01N 3/035* (2013.01); *F01N 3/106* (2013.01); *F01N 3/2053* (2013.01); *F01N 3/2066* (2013.01); *F01N 13/0097* (2014.06); *F01N 2410/00* (2013.01); *F01N 2510/0682* (2013.01); *F01N 2550/10* (2013.01); *F01N 2610/1453* (2013.01)

(58) Field of Classification Search
CPC ........... F01N 3/0878; F01N 3/22; F01N 3/20; F01N 3/2053; B01D 53/94
See application file for complete search history.

(56) References Cited

U.S. PATENT DOCUMENTS

| | | | |
|---|---|---|---|
| 3,813,226 A * | 5/1974 | Heitland et al. ............... | 422/115 |
| 8,800,270 B2 * | 8/2014 | Bailey et al. .................... | 60/288 |
| 2009/0158717 A1 | 6/2009 | Kimura et al. | |
| 2010/0199634 A1 | 8/2010 | Heaton | |
| 2011/0011065 A1 | 1/2011 | Knuth | |
| 2014/0230410 A1 * | 8/2014 | Yacoub .......................... | 60/274 |
| 2014/0230433 A1 * | 8/2014 | Yacoub ........................ | 60/605.1 |

FOREIGN PATENT DOCUMENTS

| | | | | |
|---|---|---|---|---|
| DE | 2254895 A1 * | 5/1973 | ............ | B01D 53/94 |
| DE | 102009032022 A1 | 1/2011 | | |
| DE | 202013100716 U1 | 3/2013 | | |
| EP | 10520009 A1 | 11/2000 | | |
| EP | 2107222 A1 | 10/2009 | | |

(Continued)

OTHER PUBLICATIONS

European Search Report for EP Application No. 13189986.6 mailed Mar. 18, 2014 (5 pages).

*Primary Examiner* — Timothy Vanoy

(74) *Attorney, Agent, or Firm* — Merchant & Gould P.C.

(57) ABSTRACT

The system for treating exhaust gas comprises an exhaust duct, a catalytic converter arranged in the exhaust duct and an injector for injecting a substance into the system. The system further comprises a bypass duct bypassing a section of the exhaust duct, wherein the bypass duct is arranged such that only part of the catalytic converter is bypassed by the bypass duct.

20 Claims, 1 Drawing Sheet

(56) References Cited

FOREIGN PATENT DOCUMENTS

| | | |
|---|---|---|
| KR | 20120024281 A | 3/2012 |
| WO | 2011003497 A1 | 1/2011 |
| WO | 2011102781 A1 | 8/2011 |
| WO | 2012073068 A1 | 6/2012 |
| WO | 2012080585 A1 | 6/2012 |

* cited by examiner

SYSTEM AND METHOD FOR TREATING EXHAUST PIPE

This application claims benefit of Ser. No. 13/189,986.6, filed 24 Oct. 2013 in the Europe Patent Office and which application is incorporated herein by reference. To the extent appropriate, a claim of priority is made to the above disclosed application.

BACKGROUND

The invention relates to a system and method for treating exhaust gas. More particularly, the invention relates to a system and method for treating exhaust gas of diesel engines.

In the restricted space available in exhaust systems of for example passenger cars, different converters may be arranged in a so-called closed coupled device. Such converters are, for example, an oxidizing converter to oxidize carbon monoxide and hydrocarbon and a selective catalytic reactor (SCR) to convert nitrogen oxides in the exhaust gas. In WO 2012/080585 an oxidation catalyst is arranged directly upstream of a diesel particle filter (DFP) and SCR combination. To support the catalytic reaction in the SCR, urea is injected into the limited space between the two catalysts. In order for the urea to mix with the exhaust gas, a mixing arrangement is provided between the two catalysts. However, such a mixing arrangement increases back pressure and a mixing path length before the mixture enters the SCR may not be increased. In addition, the temperature of the exhaust gas when urea is mixed into it has already decreased. Furthermore, the residence time of the urea and gas mixture is very low, particularly when exhaust gas flow is high.

It is also known to inject urea into a bypass parallel to an oxidation catalyst located upstream of a DPF and SCR combination to ensure a proper oxidation of hydrocarbon (HC) and carbon monoxide (CO). By this, exhaust gas taken from an upstream portion of the exhaust duct may directly be used for mixing with urea, which enables to operate a hydrolysis catalyst arranged in the bypass duct at a high temperature level. However, these systems require much space and do often not allow for a thorough mixing of urea with the exhaust gas before being introduced into the SCR. The portion of the exhaust gas passing through the bypass is not treated by the oxidation catalyst which may cause HC and CO emission failure during normalized driving cycles.

Therefore, there is a need for a system and method for treating exhaust gas taking care of the problems of known system and methods. Especially, there is a need for such a system and method which provides an efficient and a reliable exhaust gas treatment also in limited space conditions such as in closed coupled catalytic converter systems.

SUMMARY

According to an aspect of the invention, there is provided a system for treating exhaust gas. The system comprises an exhaust duct and a catalytic converter arranged in the exhaust duct. The system further comprises an injector for injecting a substance into the system. The substance is different from the exhaust gas and preferably comprises one or several components for supporting a chemical reaction of the exhaust gas. In the system according to the invention, a bypass duct bypasses a section of the exhaust duct, wherein the bypass duct comprising a bypass inlet and a bypass outlet is arranged such that only part of the catalytic converter is bypassed by the bypass duct.

Bypassing a portion of the exhaust duct allows for a parallel treatment of a portion of exhaust gas by the catalytic converter arranged in the exhaust duct and another, preferably smaller, portion of the exhaust gas in the bypass duct. Treatment in the bypass duct may for example be a urea injection or injection of another chemical substance into the exhaust gas, a mixing of such a substance with the exhaust gas, a chemical conversion of the injected substance and possibly also a chemical reaction. By diverting a small portion of the exhaust gas only, space velocity of the diverted portion may be decreased. A reduced flow velocity of the exhaust gas mixed with a chemical substance extends the time available for any physical or chemical process, such as for example a mixing, conversion or reaction of this mixture. Thus, time for mixing may be increased without adding space consuming constructional elements. For example, in closed-coupled devices the added substance is required for a second catalytic converter arranged downstream of the catalytic converter. However, space between the two catalytic converters basically only allows for the introduction of the chemical substance but not for a thorough mixing or its complete conversion, respectively, because of the high exhaust gas flow limiting residence time. In the system according to the invention, the mixing already takes place in the bypass duct with a portion of the exhaust gas flow, while the remaining, preferably major, portion of the exhaust gas is treated in the catalytic converter arranged in the exhaust duct.

The provision of a bypass allows the system according to the invention to be applied in applications where space is limited, as for example in an engine compartment or a bottom area of a motor vehicle, such as a passenger car. The system according to the invention is especially suitable for applications in closed-coupled systems, wherein a catalytic converter, for example an oxidation catalyst, such as for example a diesel oxidation catalyst (DOC) is arranged in series with a particle filter or another catalytic converter, for example performing a selective catalytic reaction (SRC).

In addition, in the system according to the invention hot exhaust gas may directly be used in the bypass duct for physical or chemical treatment of the exhaust gas in the bypass duct. Hot gas may be diverted at an upstream portion of the exhaust duct, preferably close to an engine outlet (where exhaust gas is hottest). The high temperatures of the diverted portion of the exhaust gas may further support a complete conversion of a chemical substance or prevent for example a crystallization and deposition of the substance in the exhaust duct or bypass duct. Using sufficiently hot gas allows for an early injection of a substance soon after a cold start of an engine without the risk of crystallization. If low crystallization takes place this further supports the constancy and reliability of the exhaust gas treatment process as well as a lifetime of a catalytic converter, especially of an SCR. Deposits of solid byproducts in an exhaust system may increase back pressure and may cause material deterioration in a catalytic converter. Also, a substance that crystallizes is not available for the following gas treatment process. In addition, crystallized substances may be released inadvertently, for example upon a temporarily hot environment and may be released out of the system in an unreacted manner if the amount of released substance may not be handled by a following gas treatment process. Since solid deposits have to be removed from a catalytic converter in order for the converter to perform in a required manner, with low crystallization a maintenance frequency may be reduced.

In the system according to the invention, the bypass duct is arranged such that only part of the length of the catalytic converter is bypassed. All exhaust gas passes through at least a part of the catalytic converter. All exhaust gas passes through the catalytic converter at least either before being diverted into the bypass duct or after reentering the catalytic converter from the bypass duct. By such an arrangement of a bypass duct, temperatures of the exhaust gas being diverted into the bypass duct are in general high. The exhaust gas is diverted either upstream of the catalytic converter or from a portion within the catalytic converter. In any case the exhaust gas is diverted into the bypass duct at a section of the exhaust duct upstream of the downstream end of the catalytic converter.

With the system according to the invention, embodiments may be realized, where the entire flow of exhaust gas is treated in the catalytic converter before being diverted and before part of it is diverted into the bypass, where the diverted portion undergoes treatment with a chemical substance. If a chemical substance is preferably injected into the bypass duct only, the catalytic converter may remain uninfluenced by the added chemical substance in these embodiments.

Further embodiments may be realized where a mixing of an exhaust gas flow with urea is additionally supported by the structure of the catalytic converter. This may be done by introducing the exhaust gas from the bypass duct into the catalytic converter, causing the exhaust gas to flow through a downstream part of the catalytic converter. In these embodiments the downstream part of the catalytic converter may additionally be provided with a catalytically active coating, a so called washcoat, to support a further catalytic reaction, for example a hydrolysis reaction of urea to improve a catalytic reaction in a following SCR.

In treatments of exhaust gas originating from engines of motor vehicles, for example hydrocarbons and carbon oxides in the exhaust gas shall be oxidized. By guiding the exhaust gas at least through a part of an oxidation catalyst, all of the exhaust gas is exposed to the oxidizing surface of the oxidation catalyst and may be oxidized. This helps to meet emission limits for these substances. In addition, in some exhaust gas treatment processes, for example of diesel engines, nitrogen oxide compounds ($NO$, $NO_2$) shall be converted. Preferably, chemical substances, for example urea or ammonia, are added to the exhaust gas to enable or support a chemical reaction of nitrogen oxide compounds in an additional selective catalytic reactor (SCR). Therein, preferably a complete conversion of the nitrogen oxide compounds is performed. However, added substances shall preferably not come into contact with the oxidizing surface of the oxidation catalyst, in order not to generate undesired or even noxious substances, such as further nitrogen oxides or ammonium nitrate ($NH_4NO_3$). However, the injected substances shall be thoroughly mixed with the exhaust gas before entering the SCR. Thus, if a diverted portion of exhaust gas from the bypass duct is reentered into the exhaust duct by reintroducing the diverted portion into the oxidation catalyst, the structure of the oxidation catalyst may support a mixing of all gas components.

In the system according to the invention, a chemical substance is injected into the bypass duct. By this, injection of the substance may take place at a part remote from the main exhaust treatment, that is, remote from the catalytic converter arranged in the exhaust duct. Thus, any crystal formation or other deposits due to the addition of a chemical substance may be limited to the bypass duct. By this, no damaging or disturbing of the exhaust treatment in the exhaust duct or in the oxidation catalyst, respectively, takes place. If deposits have to be removed, only the bypass duct has to be cleaned. This may facilitate a cleaning and simplify maintenance. For example crystallized substances are preferably removed by heating. In such processes, only the bypass duct has to be heated for cleaning. Thus heating means may be provided in or for the bypass duct only. By this, further material, time and space may be saved.

By the arrangement of a bypass duct and a catalytic converter in the exhaust duct as in the system according to the invention, exhaust treatment and mixing may be optimized in limited space conditions. In arrangements with limited space available for an introduction and mixing of a chemical substance, the advantages of the system according to the invention, such as making use of hot exhaust gas for mixing with chemical substances, increased mixing path length and making use of the catalytic converter as a mixer may prove very effective. Preferably, the system according to the invention comprises only one DOC and one SCR as the only catalytically active components of the system. Each of them may be provided or combined with a particle filter function.

Depending on the application and on the purpose of the catalytic converter or the treatment in the bypass duct, respectively, the bypass duct may be arranged accordingly. For example, a bypass may be arranged further upstream or downstream of an exhaust duct, however, always bypassing only a part of the catalytic converter when seen in a flow direction. Also, the geometry of the bypass duct may be adapted to optimize a certain functionality. For example, a residence time of exhaust gas in the bypass duct may be increased, preferably by slowing down the speed of the exhaust gas in the bypass duct or by extending a path length for the exhaust gas in the bypass duct or by a combination of these measures. Also a flow restriction may be provided by the form of the bypass duct.

The portion of the exhaust gas that is diverted from the exhaust duct and directly from the catalytic converter into the bypass duct is preferably diverted from a portion of the cross section of the catalytic converter. The diverted exhaust gas leaving the bypass duct via the bypass outlet and that is reentered into the catalytic converter into the exhaust duct, is preferably distributed over a portion of the cross section of the catalytic converter.

According to an aspect of the system according to the invention, the catalytic converter comprises a diversion outlet which is connected to the bypass inlet. Therein, the diversion outlet is arranged upstream of the downstream end of the catalytic converter.

By arranging a diversion outlet upstream of the downstream end of the catalytic converter, all exhaust gas passes through at least a part of the catalytic converter before a portion of the exhaust gas flow is diverted into the bypass duct. By this, all exhaust gas may undergo for example an oxidation process in the catalytic converter before a portion of the exhaust gas flow undergoes for example a urea or other substance treatment in the bypass duct. This may especially be favorable if the amount of exhaust gas to be treated in the bypass duct and which is diverted represents a significant amount of the total amount of exhaust gas flow. Such a significant amount may for example be up to 20 percent of the total exhaust gas flow or even larger.

If a significant amount of exhaust gas flow is not being treated by a catalytic converter, this may prove challenging in meeting emission limits for some substances in the exhaust gas.

In embodiments, wherein exhaust gas is diverted through a diversion outlet from the catalytic converter, the bypass outlet is preferably arranged downstream of the catalytic converter and upstream of a further catalytic converter. If a bypass outlet is arranged downstream of the catalytic converter, the exhaust gas flowing in the catalytic converter as well as the catalytic converter itself remain uninfluenced by the exhaust gas flow treated in the bypass duct. For example, the treatment of the exhaust gas in an oxidizing converter as catalytic converter, for example a DOC, may be kept separate from the downstream treatment of the exhaust gas in for example a SCR. Generally, the exhaust gas treatment in an SRC requires chemical additives, such as for example urea or ammonia, added to the exhaust gas to enable or support a desired chemical reaction. However, some chemical substances may lower a performance of an oxidizing converter, may damage the oxidizing surfaces in an oxidizing converter or may support unwanted chemical reactions with additives. Therefore, it may be favorable to have chemical additives introduced into the exhaust gas in the exhaust duct—typically by reinjection of the diverted portion of exhaust gas—only after or downstream of the catalytic converter. However, all exhaust gas has still been treated in at least a part of the (oxidizing) catalytic converter. In addition, an extended mixing path length for mixing the portion of the exhaust gas with the substance in the bypass duct is provided.

According to another aspect of the system according to the invention, the catalytic converter comprises a reentry inlet, which is connected to the bypass outlet. Therein, the reentry inlet is arranged downstream of the upstream end of the catalytic converter.

If the bypass outlet is connected to the catalytic converter or to the reentry inlet of the catalytic converter, respectively, the diverted portion of the exhaust gas stream is introduced into the catalytic converter somewhere along the length of the catalytic converter. The diverted an reentered portion of gas is recombined with the exhaust gas flow passing through the catalytic converter. The catalytic converter may support a mixing of the exhaust gas flow having passed through the upstream portion of the catalytic converter upstream of the reentry inlet with the reentered gas flow. Such a mixing may be favorable for a following treatment of the exhaust gas. For example, by a thorough mixing, the exhaust gas may for example be more homogenous and thus a following treatment more effective. Also, for example less chemical reactants or smaller reactive surfaces may be required.

Preferably, a portion of the exhaust gas is diverted from the exhaust duct as early as possible, i.e. most upstream in the exhaust duct, preferably close to an engine outlet. For example, the portion may be diverted upstream of the catalytic converter or in a first half of the length of the catalytic converter. Advantageously, the bypass inlet is arranged upstream of the catalytic converter. By this, the hot gases directly leaving an engine may be used in the bypass duct. This is favorable for a chemical or a physical process to be performed in the bypass duct. A physical or chemical process may for example proceed faster or more completely with hotter gas. For example, by hot gases liquid urea may be converted into gaseous ammonia. In addition, hot gases may prevent a crystallization of chemical substances in the bypass duct. Especially, the formation of solid deposits, especially at cold start of an engine may be prevented. For example also separate heating means may be omitted or be required to a limited extent only. Thereby, a reliable exhaust gas treatment process is supported and maintenance effort and costs may be reduced.

Reentry inlets and diversion outlets may by way of example only and not meant to be limited thereto, be one or a plurality of channels in the catalytic converter. Channels may for example be manufactured by milling or drilling. A channel extends from a periphery of the catalytic converter preferably into a more central region of the catalytic converter. A channel may also pass through an entire cross section of the catalytic converter, along a more peripheral region or along a more central region. Diversion outlets and reentry inlets may also have the form of a slice removed from the substrate of the catalytic converter, for example by cutting or sawing. Preferably, channels, slices or other forms of reentry inlets and diversion outlets are arranged perpendicular to channels of the substrate of the catalytic converter. However, reentry inlets and diversion outlets may also be arranged under an angle to channels of the substrate of the catalytic converter to improve a flow resistance or a flow diversion or both.

According to yet another aspect of the system according to the invention, the catalytic converter comprises a diversion outlet which is connected to the bypass inlet and a reentry inlet which is connected to the bypass outlet. Therein, the diversion outlet is arranged upstream of the reentry inlet. The bypass inlet and bypass outlet is arranged at the catalytic converter between a converter inlet and a converter outlet. By this, a portion of the exhaust gas flow is diverted from within the catalytic converter and is reentered into the catalytic converter after having flown though the bypass duct.

In such embodiments, all yet untreated exhaust gas from an engine flows into and through a part of the catalytic converter. It is treated in the catalytic converter while passing through this part of the catalytic converter. A portion of the exhaust gas is then diverted from the catalytic converter. The diverted portion of the exhaust gas flows through the bypass duct, may be mixed with a substance, and is reinserted into the catalytic converter. After reinsertion, the diverted portion flows through the remaining part of the catalytic converter, together with the not diverted portion of exhaust gas. By this, a mixing of the reentered gas portion with itself, that is, exhaust gas with the added substance, and with the exhaust gas flow having remained in the catalytic converter is supported. The substrate of the catalytic converter in that part of the catalytic converter through which the reentered gas flow passes may be provided with a catalytically active coating or may be uncoated. This will be described further below.

A mixing of a portion of the exhaust gas diverted from the exhaust gas in the exhaust duct with the main portion of the exhaust gas in the exhaust duct may further be supported by the arrangement of the two flows at the instant of recombination. For example, the flow from the bypass duct and the flow in the exhaust duct may be guided substantially perpendicular to each other upon recombination.

Preferably, a diversion outlet is arranged in a first half of the length of a catalytic converter (first half when seen in a flow direction). More preferably, the diversion outlet is arranged between 10 percent and 50 percent of the length of the catalytic converter, for example between 20 percent and 40 percent, for example 30 percent. Preferably, a reentry inlet is arranged in a second half of the length of a catalytic converter (second half when seen in a flow direction). More preferably, the reentry inlet is arranged between 50 percent and 90 percent of the length of the catalytic converter, for example between 60 percent and 80 percent, for example 70 percent.

Advantageously, an injector for injecting a chemical substance, for example liquid urea, is arranged in the bypass duct or such as to inject the chemical substance directly into the bypass duct. By this, it may be secured that the injected substance is mixed with a diverted portion of the exhaust gas in the bypass duct. The injected substance is mixed with the portion of the exhaust gas in the bypass duct before the mixture is reintroduced into the exhaust duct.

According to another aspect of the system according to the invention, a size of the bypass duct relative to a size of the exhaust duct is adapted such that a maximum partial flow of about 10 percent of a total exhaust gas flow is diverted and led through the bypass duct. Preferably a maximum partial flow in a range between 2 percent and 8 percent, more preferable in a range between 3 percent and 5 percent is diverted into the bypass duct.

Preferably, only a small portion of the exhaust gas flow is made to bypass the catalytic converter. By this, most of the exhaust gas flows through the catalytic converter, thus most of the exhaust gas flow is treated in the catalytic converter by passing the entire length of the catalytic converter. In addition, a small portion of exhaust gas flow may be slowed down in the bypass duct by a relatively small volume of the bypass duct, thus prolonging a residence time of the exhaust gas in the bypass duct. This may extend the period of time available for a reaction and a mixing of the exhaust gas in the bypass duct with the added chemical substance. By this, for example an as complete chemical reaction as possible or a mixing or a combination thereof is further supported.

In preferred embodiments of the system according to the invention, the catalytic converter is an oxidation catalyst. Oxidation catalysts, especially diesel oxidation catalyst, may oxidize exhaust gases such as hydrocarbons, carbon oxides and nitric oxide. Preferably, oxidation catalysts are used in exhaust gas treatment of exhaust gases of engines such as for example engines of motor vehicles.

According to another aspect of the system according to the invention, a portion of the catalytic converter following the reentry inlet comprises an uncoated substrate surface. In another embodiment, a portion of the catalytic converter following the reentry inlet comprises a coated substrate surface, such that the portion of the catalytic converter following the reentry inlet forms a catalyst different from an oxidation catalyst or forms a selective catalytic reactor portion. Preferably, the portion of the catalytic converter following the reentry inlet forms a hydrolysis catalyst.

The term 'uncoated' or 'coated' with reference to a substrate of the catalytic converter is used herein to refer to the nature of the substrate of the catalytic converter with respect to a catalytic activity. Generally, in an exhaust system of motor vehicles a substrate or support is used, which is coated with a catalytically active coating. Such a coating containing catalytically active components, for example platinum, palladium, $V_2O_5$ etc., is called washcoat. An uncoated substrate of the catalytic converter contains no catalytically active components.

A coated substrate may comprise one or several catalytically active components. These catalytically active components are selected to support an intended chemical reaction chosen among the intended purpose or function of the catalytic converter. Preferred functions of a catalytic converter are to support oxidation reactions, for example to form a DOC wherein CO and unburned HC is oxidized, to support hydrolysis reactions, wherein urea is composed and ammonia is formed, or to form an SCR, wherein nitrogen oxides are converted into diatomic nitrogen and water.

If a part or portion of the catalytic converter is coated to perform a catalytic function adapted to the added chemical substance in the exhaust gas flow, preferably the part of the catalytic converter following the reentry inlet is coated across its entire cross sectional area (seen in a plane perpendicular to a flow direction). However, if a reentry inlet is arranged to extend into the catalytic converter to a certain extent only, also only that part of the catalytic converter being arranged in a downstream area of the reentry inlet may be coated to provide the specific function.

According to another aspect of the invention, there is provided a method for treating exhaust gas. The method comprises the step of guiding exhaust gas through a catalytic converter arranged in an exhaust duct. The method further comprises the step of adding a substance, preferably a chemical substance to support a chemical reaction, to at least a portion of the exhaust gas and the step of diverting a portion of the exhaust gas from the exhaust duct. Therein, the diverted portion of the exhaust gas bypasses a section of the exhaust duct and bypasses a part of the length only of the catalytic converter.

According to an aspect of the method according to the invention, the step of diverting a portion of the exhaust gas comprises diverting the portion of the exhaust gas from the catalytic converter at a location upstream of a downstream end of the catalytic converter.

According to another aspect of the method according to the invention, the step of diverting a portion of the exhaust gas comprises injecting the diverted portion of the exhaust gas into the catalytic converter at a location downstream of an upstream end of the catalytic converter.

Advantages and further aspects of the method according to the invention have been described with reference to the system according to the invention and will therefore not be repeated.

The system and method according to the invention may be used in an exhaust system of a motor vehicle, preferably in motor vehicles comprising diesel engines, for example passenger cars. However, the system and method according to the invention may be applied wherever exhaust gas has to be treated, especially oxidized, hydrolyzed or wherein nitrogen oxides have to be converted in a selective catalytic reaction.

BRIEF DESCRIPTION OF THE DRAWINGS

The invention is further described with regard to some embodiments, which are illustrated by means of the following drawings. Therein the same reference numerals are used for the same or similar features.

DETAILED DESCRIPTION

Figure 1:
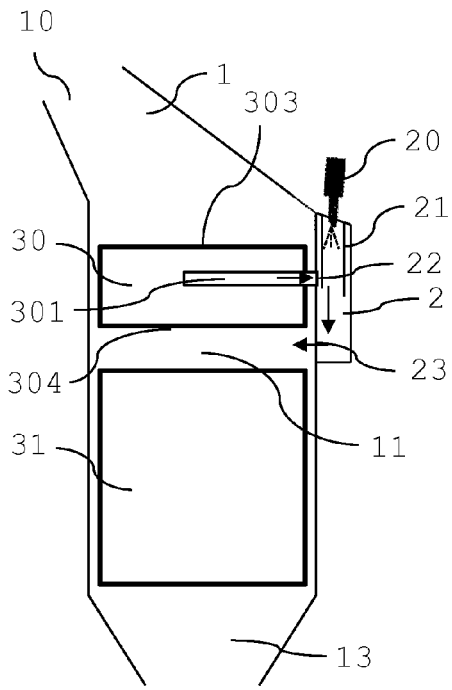
FIG. 1 shows a schematic view of an embodiment of the system according to the invention comprising a closed-coupled exhaust gas after treatment arrangement with a bypass duct having an inlet arranged between two catalytic converters.

In FIG. 1 an exhaust duct inlet 10 is arranged at an upstream end of an exhaust duct 1. At the upstream end, the exhaust duct may be connected to an engine outlet. In the exhaust duct 1 an oxidation catalyst 30, for example a diesel oxidation catalyst (DOC), is arranged followed further downstream by a selective catalytic reactor (SCR) 31. The SCR may for example also be combined with a diesel particle filter (DPF) or be provided with a particle filter function (SCRF). A bypass duct 2 with a bypass inlet 22 and a bypass outlet 23 is arranged next and substantially parallel to the exhaust duct 1. Bypass duct 2 bypasses a portion of the exhaust duct 1 and bypasses a part of the DOC 30 but not the entire DOC. Bypass duct 2 is arranged on one side of the exhaust duct 1. However, the bypass duct may also be arranged to extend at least partially or entirely around the circumference of the exhaust duct 1. The bypass duct may basically have any shape and may be arranged further away from the catalytic converter.

The DOC 30 is provided with a diversion outlet 301 connected to the bypass inlet 22 of bypass duct 2. Diversion outlet 301 has the form of an open channel reaching radially into the DOC 30, preferably from or until about the center of the DOC. Diversion outlet 301 is arranged between DOC inlet 303 and DOC outlet 304, preferably near half the length of the DOC 30 and preferably at a location slightly less than half the length of the DOC when seen in a downstream direction from the DOC inlet 303.

In the diversion outlet 301 a portion of exhaust gas flowing through the DOC 30 is collected and guided in the channel to bypass inlet 22 and into bypass duct 2. The bypass outlet 23 is connected to the exhaust duct 1 such that a gas flow leaving bypass duct 2 via bypass outlet 23 is reinserted into the exhaust duct 1 into a region 11 between DOC 30 and SCR 31. Downstream of the SCR, the exhaust duct 1 is provided with an exhaust duct outlet 13. The exhaust duct outlet 13 may for example be connected to an end pipe of an exhaust system of a motor vehicle or to a further exhaust treatment device.

An injector 20 is arranged at the bypass duct 2, upstream of bypass inlet 22. With injector 20 a chemical substance, for example urea or ammonia, may be injected into the bypass duct 2. The injection site is chosen preferably such that exhaust gas entering the bypass duct 2 immediately comes into contact with an injected substance. A heating element 21 is also arranged in the bypass duct 2, next to the injection site. The heating element 21 will be further described with reference to FIG. 4.

In the embodiment of FIG. 1, an exhaust gas leaving an engine and entering the exhaust duct 1 through exhaust duct inlet 10 enters DOC 30. A portion of the exhaust gas is guided via diversion outlet 301 from the DOC 30 into the bypass duct 2. In the bypass duct, a chemical substance is added to the diverted exhaust gas flow and mixed therewith. The diverted exhaust gas flow now mixed with the chemical substance is reentered into exhaust duct 1 downstream of the DOC 30. The exhaust gas flow having passed the entire length of the DOC 30 is recombined with the exhaust gas flow having bypassed a part of the DOC 30. The recombined exhaust gas flows into and through SCR 31 for a catalytic reaction of the nitrogen oxides in the exhaust gas flow in the SCR 31.

The so treated exhaust gas flow leaves SCR 31 and the exhaust duct by exhaust duct outlet 13.

Diversion outlet 301 and bypass inlet 22 are arranged such that the diverted portion of exhaust gas is guided into the bypass duct 2 in a perpendicular manner, i.e. perpendicular to the main flow direction of the exhaust gas in the bypass duct 2. The bypass outlet 23 is arranged such that the exhaust gas from the bypass duct 2 reenters the exhaust duct 1 also in a perpendicular manner to the exhaust gas flow in the exhaust duct. While the first arrangement supports a mixing of the diverted portion of exhaust gas with the injected fluid, the second arrangement supports a mixing of the reinserted exhaust gas portion with the main exhaust gas flow in the exhaust duct 1.

Figure 2:
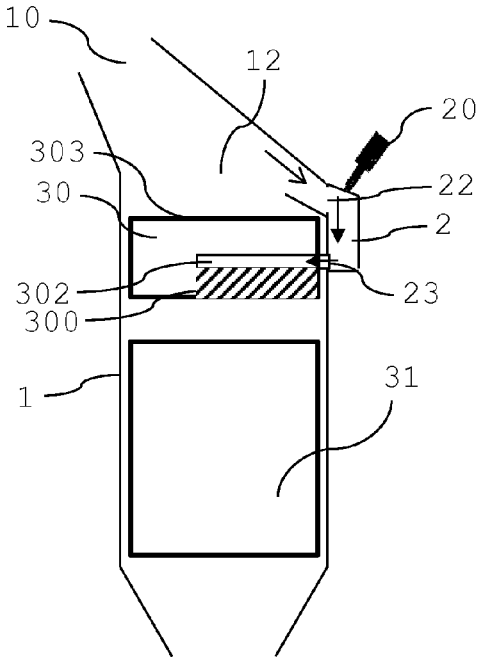
FIG. 2 shows a schematic view of another embodiment of the system with a partial catalytic converter bypass duct and a bypass inlet into the catalytic converter.

In FIG. 2 the elements of the system are basically the same as the ones of FIG. 1. However, bypass duct 2 is arranged further upstream in exhaust duct 1 closer to the exhaust duct inlet 10. Bypass inlet 22 is arranged upstream of the DOC 30. Thus, the exhaust gas coming from the engine is divided into a major portion of the exhaust gas flowing through DOC 30 and a minor portion of the exhaust gas directly flowing into and through bypass duct 2 arranged adjacent the exhaust duct 1.

The DOC 30 is provided with a reentry inlet 302, which is connected to bypass outlet 23. Reentry inlet 302 may substantially be designed in a same manner as diversion outlet 301 of FIG. 1. Reentry inlet 302 is arranged between DOC inlet 303 and DOC outlet 304, preferably near half the length of the DOC, preferably slightly more than half the length of the DOC when seen in a flow direction from the DOC inlet 303.

The exhaust gas in the bypass duct 2 is mixed with a chemical substance injected by injector 20. The gas flow through the bypass duct is then reintroduced into reentry inlet 302 of DOC 30 via bypass outlet 23. The section 300 of the DOC 30 that is arranged downstream of reentry inlet 302 preferably is an uncoated surface.

An uncoated surface stands for the catalytically inactive or uncoated substrate of the catalytic converter. The remaining sections of the DOC 30 comprise a coated substrate directed to the oxidizing function of the DOC. Since a coating directed to the oxidation of hydrocarbons and carbon monoxide may support a reaction of ammonia to form further nitrogen oxides or even harmful ammonium nitrate, contact of the oxidizing coating with ammonia may be prevented by providing the uncoated section 300.

However, section 300 may also comprise a catalytically active coating. Such a coating is preferably different from the washcoat of the remaining surfaces of the DOC 30. The different coating then supports the intended chemical reactions in section 300 of the catalytic converter and preferably prevents the formation of undesired, such as for example noxious, chemical byproducts. Such a different coating preferably supports a hydrolysis reaction. By this a hydrolysis reaction may be integrated into the component mainly acting as a DOC 30. The exhaust gas from bypass duct 2 enters the catalytic converter through reentry inlet 23, however does not flow through the oxidizing part of the DOC 30 but through section 300 following reentry inlet 23. The structure of the catalytic converter supports a mixing of the diverted and reinserted portion of exhaust gas flow before the entire exhaust gas flow enters SCR 31. Such a mixing is supported if section 300 is uncoated or comprises a washcoat.

Figure 3:
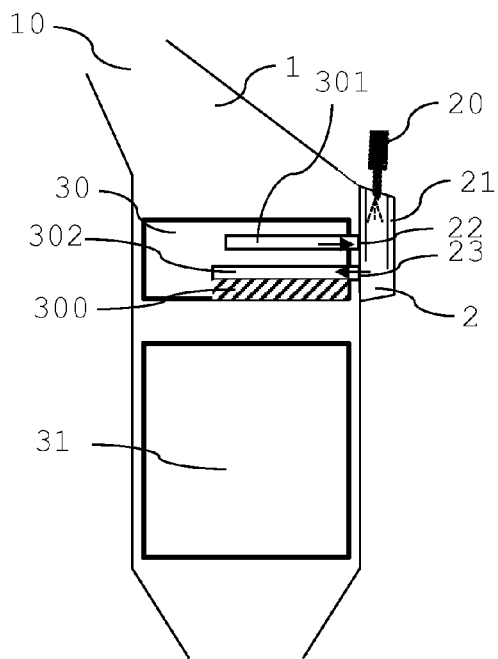
FIG. 3 shows a schematic view of an embodiment of the system with a partial catalytic converter bypass duct with a bypass inlet and a bypass outlet connected to the catalytic converter.

In FIG. 3 DOC 30 is provided with a diversion outlet 301 and a reentry inlet 302. Diversion outlet 301 is arranged in an upstream half of DOC 30 and reentry inlet 302 is arranged in a downstream half of DOC 30. Diversion outlet 301 is connected to bypass inlet 22 and reentry inlet 302 is connected to bypass outlet 23. Injector 20 and heating element 21 may be identical to the ones as described relating to FIG. 1 and FIG. 4, respectively.

The section 300 of the DOC 30 following the reentry inlet 302 may again be provided with a coated or non-coated surface as described in FIG. 2.

Figure 4:
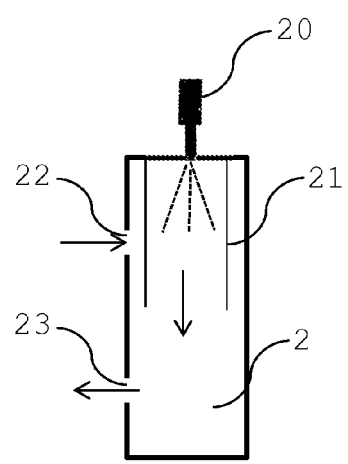
FIG. 4 shows an embodiment of a bypass duct with a heating element.

In FIG. 4 an embodiment of a bypass duct 2 with injector 20 and heating element 21 is shown in an enlarged view. A diverted portion of exhaust gas flows via bypass inlet 22 into an upper or upstream portion of the bypass duct 2. Injector 20 and heating element 21 are arranged in this upper portion of the bypass duct. A substance is injected into bypass duct 2 into this upper portion. After having been mixed and if required also heated the so treated portion of exhaust gas/substance mixture leaves bypass duct 2 via bypass outlet 23 and may be reinserted into exhaust duct 1.

Preferably, the heating element 21 has an open structure to provide a free flow of exhaust gas and of injected substance into the entire bypass duct 2. A heating element 21 may for example be heating wires or a heatable mesh, for example metal wires or metal mesh. The heating element 21 preferably extends into the bypass duct further downstream of the bypass inlet 22. This supports the heating of exhaust gas entering bypass duct 2 as well as of an injected substance. By heating, a physical process or chemical reaction in the bypass duct may be enabled or further enhanced.

Heating element 21 may also be used for the prevention of crystallization of a substance for example on bypass walls. Heating element 21 may further or in addition be used for cleaning of the bypass duct 2, for example to remove crystallized substances or other solid deposits from walls of the bypass duct 2.

The invention has been described with reference to the embodiments shown in the drawings. However, further embodiments and variations may be envisaged without departing from the scope of the invention. By way of example only, the location and design of the diversion outlets and reentry inlets may be varied. Also the design and arrangement of a bypass duct may be varied. In addition, arrangements of catalytic converters other than closed coupled DOC-SCR may be constructed and further catalytic converters or particle filters may be provided.

The invention claimed is:

1. System for treating exhaust gas, the system comprising:
   an exhaust duct;
   a catalytic converter arranged in the exhaust duct;
   an injector for injecting a substance into the system;
   a bypass duct comprising a bypass inlet and a bypass outlet, the bypass duct bypassing a section of the exhaust duct, wherein the bypass duct is arranged such that only part of the catalytic converter is bypassed by the bypass duct, wherein the catalytic converter comprises a diversion outlet, which is connected to the bypass inlet, and wherein the diversion outlet is arranged upstream of the downstream end of the catalytic converter.

2. The system according to claim 1, wherein the bypass outlet is arranged downstream of the catalytic converter and upstream of a further catalytic converter.

3. The system according to claim 1, wherein the catalytic converter comprises a reentry inlet, which is connected to the bypass outlet, and wherein the diversion outlet is arranged upstream of the reentry inlet.

4. The system according to claim 3, wherein a portion of the catalytic converter following the reentry inlet comprises an uncoated substrate surface.

5. The system according to claim 3, wherein a portion of the catalytic converter following the reentry inlet comprises a coated substrate surface such that the portion of the catalytic converter following the reentry inlet forms a catalyst different from an oxidation catalyst.

6. The system according to claim 1, wherein the injector is arranged to inject the substance into the bypass duct.

7. The system according to claim 1, wherein a size of the bypass duct relative to a size of the exhaust duct is adapted such that a maximum partial flow of about 10 percent of a total exhaust gas flow is bypassed through the bypass duct.

8. The system according to claim 1, wherein the catalytic converter is an oxidation catalyst.

9. Method for treating exhaust gas, the method comprising the steps of:
   guiding exhaust gas through a catalytic converter arranged in an exhaust duct;
   adding a substance into at least a portion of the exhaust gas;
   diverting a portion of the exhaust gas from the exhaust duct;
   wherein the diverted portion of the exhaust gas bypasses a section of the exhaust duct and bypasses a part of the length only of the catalytic converter; wherein the step of diverting a portion of the exhaust gas from the exhaust duct comprises reinjecting the diverted portion of the exhaust gas into the catalytic converter at a location downstream of an upstream end of the catalytic converter.

10. The method according to claim 9, wherein the step of diverting a portion of the exhaust gas from the exhaust duct comprises diverting the portion of the exhaust gas from the catalytic converter at a location upstream of a downstream end of the catalytic converter.

11. The method according to claim 9, further comprising the step of adding the substance into the portion of the exhaust gas diverted from the exhaust duct.

12. A system for treating exhaust gas, the system comprising:
    an exhaust duct;
    a catalytic converter arranged in the exhaust duct;
    an injector for injecting a substance into the system;
    a bypass duct comprising a bypass inlet and a bypass outlet, the bypass duct bypassing a section of the exhaust duct, wherein the bypass duct is arranged such that only part of the catalytic converter is bypassed by the bypass duct, wherein the catalytic converter comprises a reentry inlet, which is connected to the bypass outlet, and wherein the reentry inlet is arranged downstream of the upstream end of the catalytic converter.

13. The system according to claim 12, wherein the bypass inlet is arranged upstream of the catalytic converter.

14. The system according to claim 12, wherein the injector is arranged at the bypass duct.

15. The system according to claim 12, wherein a size of the bypass duct relative to a size of the exhaust duct is adapted such that a maximum partial flow of about 10 percent of a total exhaust gas flow is bypassed through the bypass duct.

16. The system according to claim 12, wherein the catalytic converter is an oxidation catalyst.

17. The system according to claim 12, wherein a portion of the catalytic converter following the reentry inlet comprises an uncoated substrate surface.

18. The system according to claim 12, wherein a portion of the catalytic converter following the reentry inlet comprises a coated substrate surface such that the portion of the catalytic converter following the reentry inlet forms a catalyst different from an oxidation catalyst.

19. The system according to claim 12, wherein the catalytic converter comprises a diversion outlet, which is connected to the bypass inlet, wherein the diversion outlet is arranged upstream of the reentry inlet.

20. A method for treating exhaust gas, the method comprising the steps of:
    guiding exhaust gas through a catalytic converter arranged in an exhaust duct;
    adding a substance into at least a portion of the exhaust gas;
    diverting a portion of the exhaust gas from the exhaust duct;
    wherein the diverted portion of the exhaust gas bypasses a section of the exhaust duct and bypasses a part of the length only of the catalytic converter, and wherein the step of diverting a portion of the exhaust gas from the exhaust duct comprises diverting the portion of the exhaust gas from the catalytic converter at a location upstream of a downstream end of the catalytic converter.

* * * * *